United States Patent [19]
Kinkead et al.

[11] Patent Number: 6,024,033
[45] Date of Patent: Feb. 15, 2000

[54] SEEDER APPARATUS FOR DISPENSING SEED WITH OR WITHOUT TOP DRESSING

[75] Inventors: John Kinkead, St, Paul; George B. Kinkead, Mendota Heights; Scott Kinkead, St. Paul; Matthew A. Donner, St. Anthony, all of Minn.

[73] Assignee: Turfco Manufacturing, Inc., Menneapolis, Minn.

[21] Appl. No.: 09/148,341

[22] Filed: Sep. 4, 1998

Related U.S. Application Data

[63] Continuation-in-part of application No. 08/675,653, Jul. 3, 1996, Pat. No. 5,802,994.

[51] Int. Cl.⁷ .............................. A01G 1/12; A01C 15/16; A01C 15/06
[52] U.S. Cl. ............................. 111/11; 111/130; 221/253; 239/668
[58] Field of Search ................. 111/177, 11, 130, 111/925, 170, 200; 222/282, 287; 221/253; 239/668, 669

[56] References Cited

U.S. PATENT DOCUMENTS

| | | |
|---|---|---|
| 55,372 | 6/1866 | Sherwood . |
| 254,957 | 3/1882 | Grow . |
| 260,315 | 6/1882 | Parry . |
| 397,215 | 2/1889 | Ballard . |
| 729,774 | 6/1903 | Kralinger et al. ................. 111/11 |
| 810,510 | 1/1906 | Robins, Jr. . |
| 817,704 | 4/1906 | Garst . |
| 874,982 | 12/1907 | Norton . |
| 979,200 | 12/1910 | Prosser . |
| 1,515,987 | 11/1924 | Allison . |
| 1,639,203 | 8/1927 | Varnado . |
| 2,030,541 | 2/1936 | Rose . |
| 2,141,044 | 12/1938 | Rassmann . |
| 2,321,082 | 6/1943 | Harshberger . |
| 2,602,669 | 7/1952 | Givenrod . |
| 2,733,828 | 2/1956 | Neff . |
| 2,770,400 | 11/1956 | Mattson . |
| 2,774,602 | 12/1956 | Sanderson . |
| 2,865,536 | 12/1958 | Price . |

(List continued on next page.)

FOREIGN PATENT DOCUMENTS

| | | |
|---|---|---|
| 993310 | 8/1949 | France . |
| 78543 | 6/1962 | France ..................... 111/130 |
| 109636 | 5/1899 | Germany . |
| 248403 | 3/1911 | Germany . |
| 2134615 | 1/1973 | Germany . |
| 244274 | 1/1928 | Italy ......................... 111/11 |
| 5137411 | 6/1993 | Japan ...................... 111/11 |
| 5137412 | 6/1993 | Japan ...................... 111/11 |
| 963912 | 2/1983 | U.S.S.R. . |
| 858411 | 1/1961 | United Kingdom ........... 111/925 |
| WO8602520 | 5/1986 | WIPO . |
| WO8807813 | 10/1988 | WIPO . |

*Primary Examiner*—Christopher J. Novosad
*Attorney, Agent, or Firm*—Alan Kamrath; Oppenheimer, Wolff & Donnelly, LLP

[57] ABSTRACT

The seeder apparatus includes a material hopper for dispensing material onto a conveyor to be moved thereby to an entry nip between a rotary brush and the conveyor for propelling the material downwardly at the discharge end. In one embodiment, a metering gate extends vertically in its closed position relative to the conveyor, with the metering gate controlling the rate of dispensation of seed or other material being moved to the entry nip. A shield assembly is provided to minimize the effects of wind on the trajectory of seed or other material being propelled to the ground by the brush and conveyor. In preferred forms, a separate seed hopper is mounted to the top dresser, and in a second embodiment, either seed from the seed hopper and/or dressing material from the top dresser hopper may be moved by the conveyor to the entry nip. In other embodiments, a terrain opening element in the form of a spiking roller is provided to puncture the terrain before top dressing and/or seeds are dispensed, and a brush element in the form of a pull brush is provided to move seed and any top dressing supported on grass blades downward in the terrain.

19 Claims, 4 Drawing Sheets

U.S. PATENT DOCUMENTS

| | | |
|---|---|---|
| 2,872,080 | 2/1959 | Thene . |
| 2,913,150 | 11/1959 | Seale . |
| 2,946,597 | 7/1960 | Simonsen . |
| 2,962,381 | 11/1960 | Dobry et al. . |
| 3,336,627 | 8/1967 | Nemoede et al. . |
| 3,392,884 | 7/1968 | Waldrum . |
| 3,561,380 | 2/1971 | Adams, Jr. . |
| 3,587,933 | 6/1971 | Regnier et al. . |
| 3,693,890 | 9/1972 | Torrey . |
| 3,756,382 | 9/1973 | Adey, Jr. et al. . |
| 3,788,529 | 1/1974 | Christy . |
| 3,815,527 | 6/1974 | Dobbins ................................. 111/11 |
| 3,822,655 | 7/1974 | Benedict et al. . |
| 4,029,237 | 6/1977 | Miconi . |
| 4,234,105 | 11/1980 | Viramontes . |
| 4,288,008 | 9/1981 | Amblard et al. .................... 111/130 X |
| 4,436,226 | 3/1984 | Aggen . |
| 4,438,837 | 3/1984 | Stoppani et al. . |
| 4,438,873 | 3/1984 | Kaercher, Jr. . |
| 4,646,941 | 3/1987 | Grosse-Scharmann et al. ... 111/177 X |
| 4,709,861 | 12/1987 | Henderson . |
| 4,767,063 | 8/1988 | Wall et al. . |
| 4,804,145 | 2/1989 | Seymour et al. . |
| 4,896,615 | 1/1990 | Hood, Jr. et al. ....................... 111/177 |
| 4,901,655 | 2/1990 | Magda . |
| 4,926,768 | 5/1990 | Magda . |
| 5,307,952 | 5/1994 | Worrel et al. . |
| 5,802,994 | 9/1998 | Kinkead et al. ........................... 111/11 |

SEEDER APPARATUS FOR DISPENSING SEED WITH OR WITHOUT TOP DRESSING

CROSS REFERENCE

The present application is a continuation-in-part of application Ser. No. 08/675,653 filed on Jul. 3, 1996, now U.S. Pat. No. 5,802,994.

BACKGROUND (1) Field of the Invention

This invention relates to apparatus for spreading seed, especially grass seed, onto the terrain, and more particularly to a top dresser and to a seeder attachment mountable to a top dresser for dispensing or spreading seed with or without spreading top dressing material for seeding and/or applying top dressing material to the terrain.

(2) Description of the Prior Art

Various apparatus exist for applying top dressing to the turf of golf courses, lawns, football, baseball and soccer fields, parks, recreational areas and the like. One example of such apparatus is disclosed in U.S. Pat. No. 5,307,952 which is incorporated herein by reference. Further, it is old to provide seeders that rely on gravity (free fall) to move the seeds from the seed hopper to a prepared or non-prepared seed area (ground) and to seeders having a wheel rotatable about a vertical axis for spreading seed that falls from the hopper onto the wheel and thence relies on gravity to fall to the ground. With such seeders, when seeding grassy areas, frequently the seeds will lie on the grass or leaves without any contact with the soil. As a result the seeds do not germinate. In the event the seeds fall on the top of exposed soil, usually the soil contacts only the bottoms of the seed. Accordingly, the germination rate is not as high as desired.

Carrying out the application of top dressing to the terrain in one operation, the application of seeds to the terrain in a separate operation, and the preparation of the terrain and/or moving the seeds and top dressing downward in the terrain in further separate operations are more labor intensive and time consuming than desired, and having to provide separate wheel supported vehicles to accomplish all operations, requires a greater investment in equipment than desired.

In order to obviate problems such as the above, this invention has been made.

SUMMARY

In one embodiment, the seeder apparatus includes a top dresser having a wheel supported frame for mounting a hopper for containing seed without top dressing material in the hopper, a conveyor for moving seed from the hopper and beneath a vertically extending metering gate, and a rotary brush having bristles for contacting the conveyor to cooperate with the conveyor for downwardly propelling seeds on the conveyor that have passed beneath the metering gate onto turf or other areas that are to be seeded. A shield assembly is mounted to the frame opposite the brush from the metering gate to extend above and below the brush for shielding the downwardly propelled seed from the effects of wind.

A second embodiment of the seeder apparatus includes a seeder attachment mounted to a top dresser for dispensing seed onto the conveyor intermediate the top dresser metering gate and the brush with or without being dispensed onto top dressing material. The seeds and/or the dressing material is propelled downwardly by a brush cooperating with the conveyor. The seed attachment includes a seed hopper and a seed distributor for receiving seed from the seed hopper when the seed metering gate is open and dispensing the seed to fall onto a seed guide and thence onto the ribbon of top dressing, if any, on the conveyor after the dressing material has moved beneath the top dresser metering gate.

In other embodiments, a top dresser discharging material moved from a hopper by a conveyor between the lower edge of a discharge end wall and a metering gate and the conveyor at a discharge end portion includes suitable provisions mounted to the top dresser frame for preparing the terrain to have exposed soil before the material is discharged to the terrain at the discharge end portion. In most preferred aspects, provisions also mounted to the top dresser frame are provided for moving the material downward to and into the terrain after the material is discharged to the terrain at the discharge end portion.

One of the objects of this invention is to provide new and novel means for dispensing and propelling seed onto a prepared or unprepared seed bed area. Another object of this invention is to provide a new and novel seeder attachment that is mountable to a top dresser for dispensing seed to be applied to turf with or without the dispensing of top dressing material. A further object of this invention is is to provide new and novel combined seeder and top dresser means to selectively dispense and downwardly propel metered amounts of seeds and/or top dressing material onto turf or other terrain.

Another object of this invention is to provide a new and novel metering mechanism for controlling the rate of dispersion from a hopper, of seed or top dressing material that is to be applied to turf or other terrain. A further object of this invention is to provide new and novel means mountable to a seeder or top dresser for protecting the trajectory of dispensed seeds or other material from the effects of wind as the material is being propelled to the terrain.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
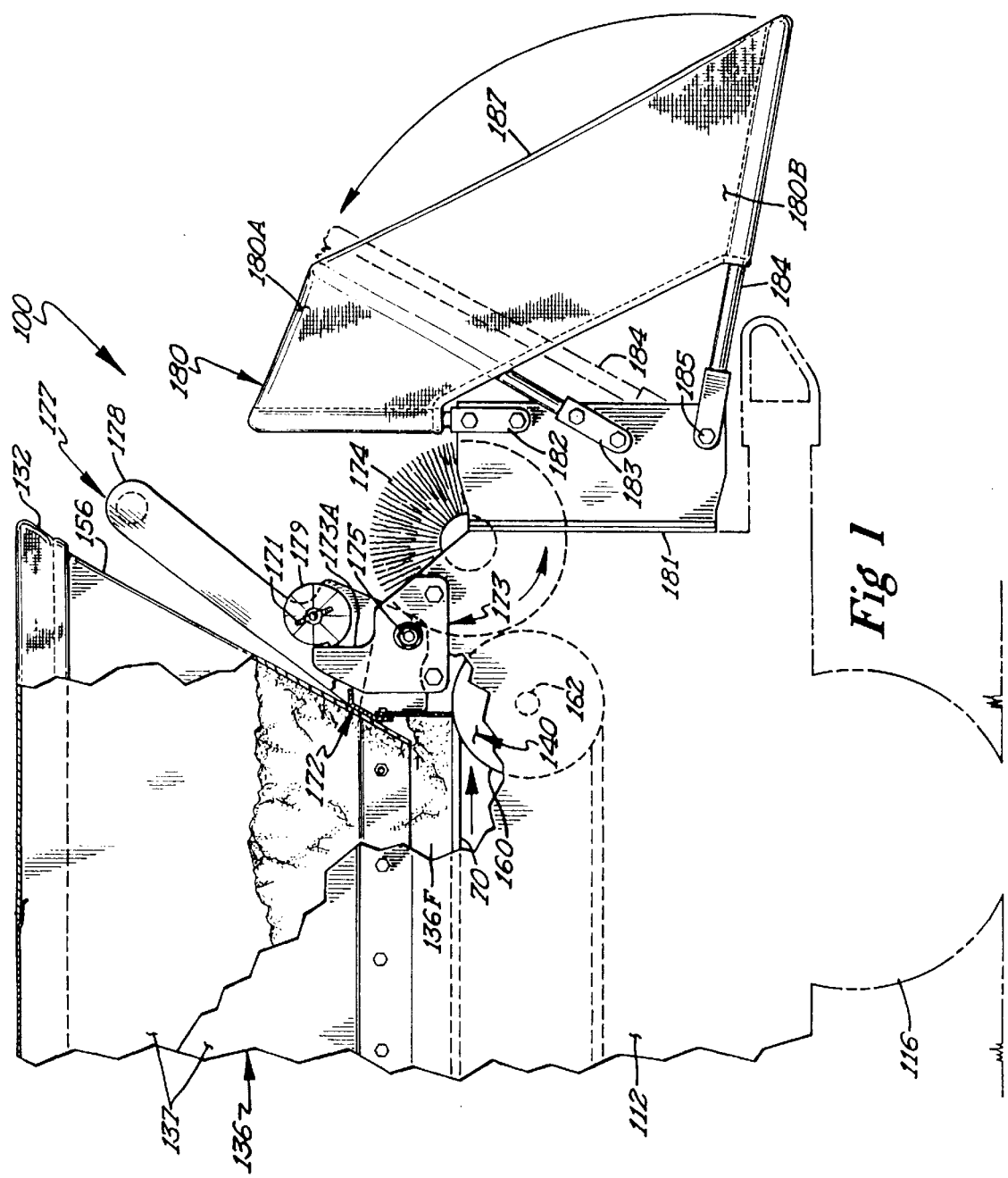
FIG. 1 shows a fragmentary view of the first embodiment according to the preferred teachings of the invention, with parts broken away.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "inside", "outside", "front", "back", "outer", "inner", "upper", "lower", "height", "width", "length", "thickness", "end", "side", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

The seeder apparatus of this invention includes a top dresser, generally designated 100, that may be of an endless conveyor-type such as disclosed in U.S. Pat. No. 4,438,873, which is incorporated herein by reference, and in particular to FIGS. 5 and 6 and the disclosure relative thereto. The top dresser 100 can be a self propelling motorized vehicle or can have a drawbar (not shown) that can be coupled to a motorized vehicle to be pulled in a longitudinal direction. The top dresser comprises a frame 112 movably supported by high flotation wheels 116.

Figure 2:
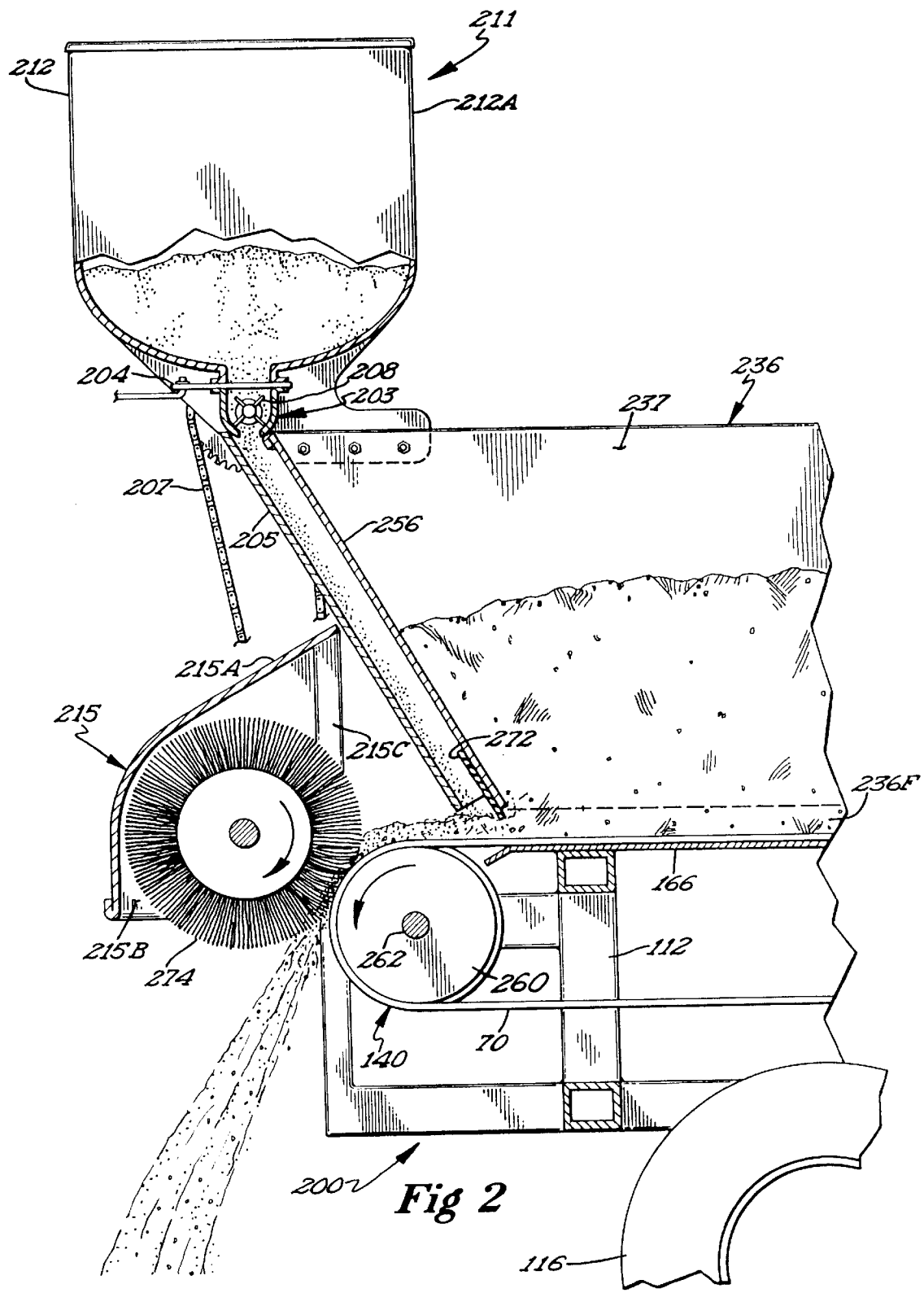
FIG. 2 shows a fragmentary view of the second embodiment according to the preferred teachings of the invention, with parts broken away.

A seed hopper, generally designated 136, is mounted on frame 112 and includes an open top covered by a removable closure 132, closed side walls 137, a discharge end wall 156 and a longitudinally opposite end wall (not shown). The hopper walls provide an open hopper bottom 136F that opens to a conveyor, generally designated 140. The conveyor 140 is disposed so that sheeting in the form of an endless belt 70 passes beneath the interior of the hopper 136, more specifically extends under the lower edge of the discharge end wall 156, 50 as to have gravitationally discharged thereon whatever material is contained in hopper 136. The discharge end wall extends at an included angle greater than 50 degrees and substantially less than 90 degrees with reference to the discharge end portion of the conveyor belt upper run and the horizontal. Desirably, the belt 70 has spaced ribs or channels (not shown) such as disclosed with reference to FIG. 6 of U.S. Pat. No. 5,307,952 wherein the ribs extend transversely across the belt, for example diagonally such as referred to in said patent. The endless belt 70 passes over a first, generally cylindrical roller 160 rotatably mounted on a transverse shaft 162 and over a second cylindrical roller (not shown). Roller 160 is rotated by any suitable means such as being ground driven in the manner shown in U.S. Pat. No. 4,438,873. Sheeting 70 passes over a platen or bed plate 166 that is fixedly supported by frame 112 of the top dresser 100 such as shown in FIG. 2. Conveyor 140 dispenses seeds from hopper 136 that have moved under the lower edge of the discharge end wall 156 onto the ground.

Figure 3:
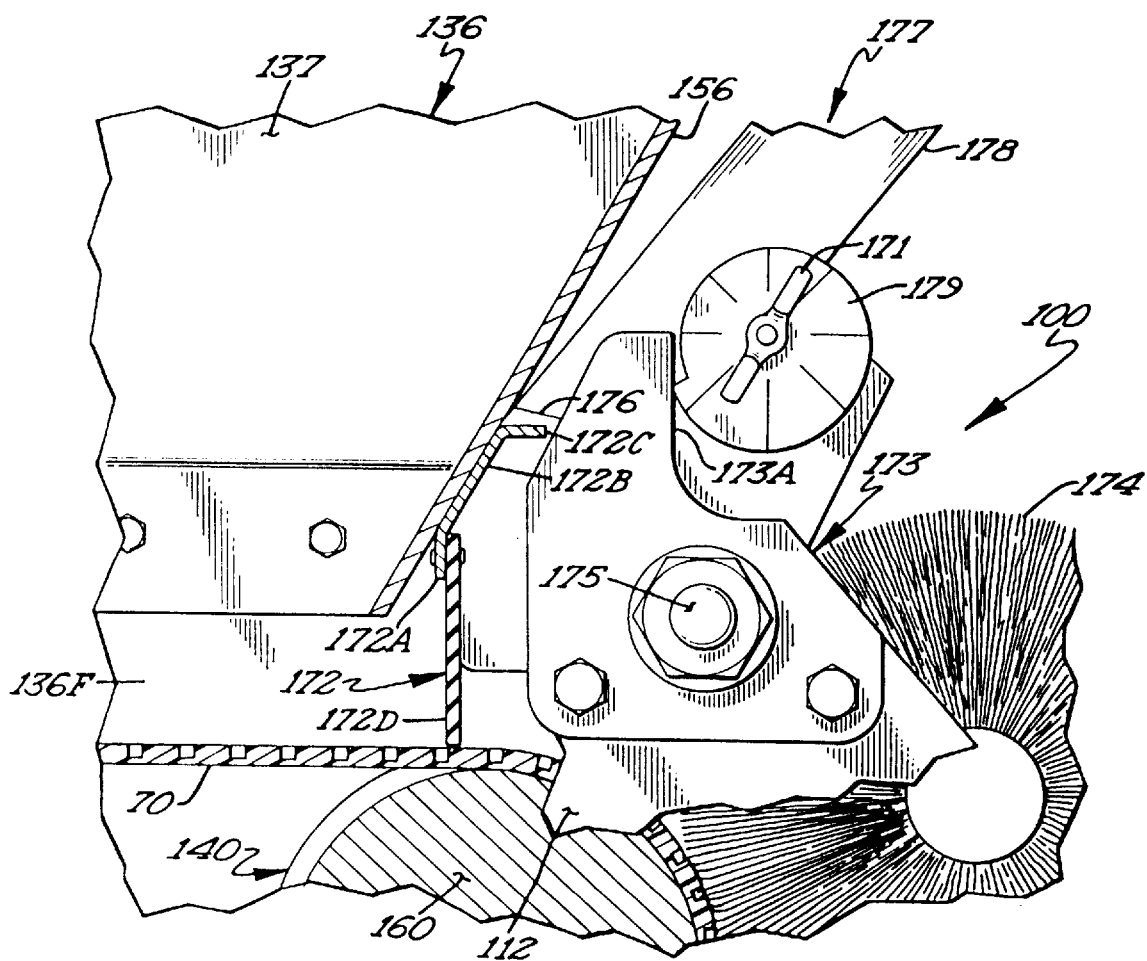
FIG. 3 shows an enlarged fragmentary view of a portion of the embodiment of FIG. 1 to more clearly show the metering gate mechanism.
Figure 4:
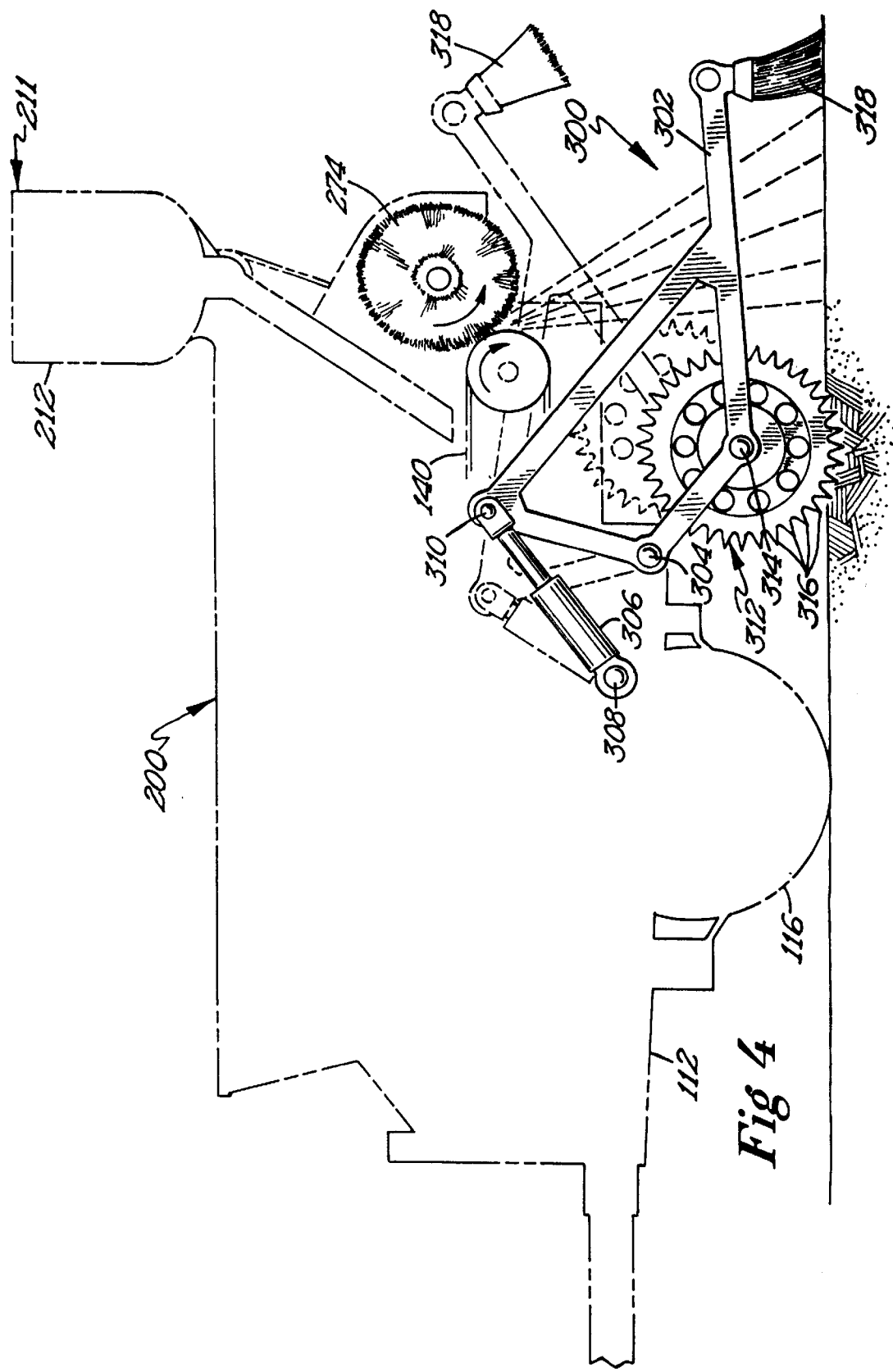
FIG. 4 shows a fragmentary view of the third embodiment according to the preferred teachings of the invention, with parts broken away.

The seeder apparatus or top dresser 100 further includes a metering gate assembly, generally designated 177 (see FIG. 3), movably mounted at the discharge end wall 156 of hopper 136 and movably mounted to meter the amount of material to be dispensed as the conveyor belt upper run moves thereunder. The metering gate assembly includes transversely spaced frame brackets 173 mounted to frame 112. A transverse pivot rod 175 is pivotally mounted to the frame brackets 173, with mounting brackets 176 mounted to the pivot rod to pivot therewith. A metering gate 172 is mounted to the mounting brackets to pivot therewith and extends transversely between the side walls 137 and is movable relative to the conveyor between opened and closed positions. The metering gate in its closed position abuts against the upper run of the belt 70 to close the discharge opening between the upper run of the sheeting and the lower edge of the discharge end wall and extends perpendicularly to the belt upper run and, when moved to its open position to create a gap, is pivoted only a few degrees.

The metering gate 172 includes an upper metal part having an intermediate angle part 172B that extends across the width of the discharge end wall and at an angle relative to the conveyor belt upper run that is the same as the angle of the discharge end wall 156 relative to the belt discharge end portion when the gate is in its closed position. The metal part also includes a flange 172C joined to the angle part 172B to extend generally horizontally away from the discharge end wall and a lower part 172A. The lower part 172A mounts a lower gate part 172D of a somewhat flexible material, with the gate part 172D extending vertically (essentially perpendicular to the belt upper run) when the gate is in its closed position. Preferably the gate part 172D extends at an angle of a few degrees that is downwardly and horizontally in the direction of movement of the upper run of the conveyor belt. With the gate angle part 172B abutting against the discharge end wall, seed is precluded from moving upwardly above part 172B between the metering gate and the discharge end wall and also protects against wind currents moving downwardly between the discharge gate and the discharge wall.

Due to the provision of the ribs, when conveyor is being driven and the lower gate part 172D is in its closed vertical position abutting against the ribs, seeds are being conveyed beneath the lower edge of the metering gate part 172D. In order to pivot the metering gate to its open position wherein the gate part 172D is only a fraction of an inch above the belt upper run, a control member 178 is joined to the pivot rod. Rather than the control member 178, the rod may be pivoted to an open position by any suitable means to create a gap for the passage of material such as by pivotally moving gate 172 manually or by a hydraulic actuator or other suitable apparatus (not shown).

A disk 179 is pivotally mounted to one of the brackets 176 for abutting against the vertical edge 173A of the adjacent bracket 173. The disk has a spiral shaped outer peripheral surface abuttable against edge 173A, with the disk being retained in a selected angular position relative to bracket 173 by tightening a wing nut 171. Accordingly, the gate may be moved from its closed position to an open position providing the desired gap between the metering gate and the conveyor and control member 178 moved to abut against edge 173A and the wing nut tightened. Thus, the gate can be moved to its closed position and then reopened until control member 178 abuts against edge 173A so that the same gap exists between the gate and the conveyor.

A transverse cylindrical brush 174 is movably and rotatably mounted at the discharge end portion of the frame to extend above and parallel to roller 160. Brush 174 is on the longitudinal side of gate 172 opposite the interior of the hopper 136 and in the same direction from gate 172 as the movement of the upper run of sheeting 70 above the bed plate. The bristles of the brush contact the seeds on the belt after the seeds have started to move downwardly along with the belt and have passed through the vertical plane of the axis of rotation of the roller 160. Thus, the entry nip of the brush and the conveyor belt is on the opposite longitudinal side of the vertical plane of the axis of rotation of the roller 160 from the metering gate 172. Brush 174 is rotated in an opposite direction as roller 160 to propel material on sheeting 70 onto the ground being dressed with sufficient force to penetrate to the base of the turf. The trajectory of the seeds from tangential contact of the brush with the belt is vertically downward to the ground in a direction away from the conveyor. The discharge end portion of the frame 112 is of a construction so as not to interfere with the seed being propelled downwardly by the coaction of the conveyor and the brush.

Advantageously a shield assembly, generally designated 180, is mounted to the frame 112 adjacent to the discharge end of the frame to shield the trajectory of the seed from wind effects as the seed is being downwardly propelled by the brush from the sheeting 70 to the ground. The shield assembly includes transversely spaced frame members 181 mounted to the frame 112 longitudinally opposite the hopper end wall 156 and transversely outwardly of the bristles of the brush 174. A generally U-shaped bracket 182 has its legs mounted to the frame members 181 with its transversely extending web portion at a higher elevation than the top of the brush and longitudinally adjacent to the brush and at a higher elevation than the conveyor upper run. A second generally U-shaped bracket 183 likewise has its legs mounted to frame members 181, but with its web portion more remote from the hopper end wall 156 and at a lower elevation than the web portion of the bracket 182. A generally U-shaped bracket 184 has its legs pivotally attached to the frame members 181 by pivot members 185 for pivotal movement between the solid line lowered position of FIG. 1 to the raised dotted line position so that the bracket web portion is adjacent to the web portion of bracket 183. The web portions of the brackets are transversely centered relative to the brush and are of greater transverse dimensions than the corresponding dimension of the brush.

The shielding assembly includes a sheet of canvas or other suitable material 187 having one transverse edge which has opposite edge portions mounted to the legs of bracket 182 to extend adjacent to the frame members 181 and a web portion mounted to the bracket web portion and an opposite transverse edge mounted to the legs and web portion of bracket 184. With the bracket 184 in its lowered position, the upper web section 180A extends downwardly in a direction away from the discharge end wall 156 from the bracket 182 to bracket 183 and thence along its lower web section 180B at a steeper angle to the web portion of bracket 184 which is at a substantially lower elevation than the brush and the conveyor belt. Thus, the canvas (covering) is of a generally downwardly and longitudinally U-shaped configuration in transverse cross section that opens toward the brush and the hopper 136. The bracket 184 may be pivoted to its raised dotted line position to prevent damage to the shielding assembly, for example when transporting the top dresser over rough terrain (when not applying seed to the terrain) such as going over a curb. When the bracket 184 is in its raised position, advantageously its web portion and the web portion of the canvas is at a higher elevation than the lowermost part of the brush and the conveyor belt. Suitable means (not shown) may be provided for selectively retaining the bracket 184 in its pivoted raised position.

In using the first embodiment with seed having been loaded into the hopper 136, the metering gate 172 in the desired relationship to the upper run of the conveyor and the frame being moved in a longitudinal direction along the terrain with roller 160 and brush 174 rotating, seed is propelled in a downward direction. The shield assembly in its lowered position shields the trajectory of downward movement of seed from the effects of wind as the seed moves out of the exit nip between the brush and the conveyor.

In the event the seeder apparatus 100 is to be used for dispensing top dressing, the gear ratio (gears not being shown) for driving the conveyor relative to the speed of movement of the apparatus over the ground may be increased (gears changed) to drive the conveyor faster than for seeding the terrain. It is to be understood other suitable means, for example, variable speed hydraulic drives may be provided for driving the conveyor and/or brush 174.

For utilizing a top dresser to dispense seeds onto ground with or without top dressing material being dispensed, there is provided a second embodiment of the invention which includes a seeder attachment, generally designated 211 and a top dresser, generally designated 200, which may be of the same construction as that disclosed in U.S. Pat. No. 5,307,952. The seeder attachment includes a seed hopper 212 mounted to the top dresser, and advantageously to the top dresser hopper, generally designated 236, to extend thereabove. The seed hopper includes an upward extending peripheral wall 212A having a longitudinally narrowed, transversely elongated neck portion to discharge into a seed distributor 203. A metering gate 204 is mounted to the seed hopper for movement between a position blocking gravitational flow of seed from the seed hopper to the distributor and selected opened positions allowing selected metered rates of seed flow to the distributor.

The top dresser hopper 236 includes transversely opposite side walls 237, a discharge end wall 256 and a longitudinally opposite end wall (not shown) to provide an open bottom top dresser hopper that is closed by the upper run of the sheeting 70 of the conveyor 140. At least one end wall 256 may be sloped downwardly toward the opposite hopper end wall to facilitate the movement of material in the top dresser hopper. A slide or chute 205 extends transversely between the hopper side walls and beneath the distributor 203 to cooperate with the top dresser hopper end wall 256 for guiding seed discharged by the distributor 203 to descend onto the sheeting 70 longitudinally intermediate a transverse rotary brush 274 and the hopper end wall 256. The slide has a lower discharge end portion adjacent to and above the upper run of the belt longitudinally intermediate the discharge end wall lower edge and the brush 274.

The transverse dimensions of the slide 205 and distributor are desirably substantially the same as the corresponding dimension of the sheeting 70 so that the seeds are evenly dispersed over the transverse dimension of the sheeting. A drive connection 207 is provided between the rotary vane member 208 of the distributor 203 and the brush 274 and/or the conveyor to maintain the desired rate of seed distribution. The vane member extends transversely substantially the entire transverse dimension of the adjacent part of the discharge end wall 256. Advantageously, there is provided a suitable drive connection (not shown) between the brush and one of the wheels or another suitable type drive, for example, a hydraulic drive (not shown) to the brush and/or the conveyor such that the rate of downward propulsion of seeds and/or top dressing material onto the soil varies with the speed of movement of the vehicle along the terrain to evenly distribute the seed on the terrain.

The lower end of the discharge end wall 256 terminates vertically above the upper run of the sheeting 70, with the upper run extending transversely between the lower end portions of the side walls of the top dresser hopper 236. A top dresser metering gate 272 is movably mounted adjacent to the lower end of the discharge end wall 256 for controlling the amount of material being conveyed from the interior of the top dresser hopper 236 to the transverse brush 274. The metering gate 272 has suitable provisions (not shown) extending through hopper and/or chute walls for being adjusted in a conventional manner.

Advantageously, a shield assembly 215 is mounted to the frame 112 to have its upper web portion 215A above the entire transverse dimension of the brush and is longitudinally curved to have its web portion 215B extend downwardly along the brush opposite the conveyor to extend below the transverse axis of rotation of the brush. The shield web portions extend between and are joined to the vertical legs 215C of the shield assembly that extend along the opposite ends of the brush, with the legs being mounted to the frame 112.

In using the second embodiment with top dressing material having been loaded into the top dresser hopper and seeds having been loaded into the seed hopper, when material from the top dresser hopper is to be dispensed onto the sheeting 70 and, if at the same time seed is to be dispensed from the seed hopper, the seed is directed to land on the ribbon of top dressing material which is moving out of the top dresser hopper at a specified rate of speed and at a predetermined thickness selected by the operator to achieve the desired results. The seeds are deposited in a quantity established by the setting of the metering gate 204. When the layered material (seed and top dressing) reaches the rotating brush 274 at the discharge end portion of the frame, the layered material is accelerated and driven downwardly into the turf. The layered material is agitated and mixed by the action of the rotating brush, and also during its downward movement. Such action ensures that the seed will be deposited onto the ground in a nearly homogeneous fashion within the top dressing material. The seeds are kept in this close environment with soil particles during this time and will have contact on all of their surfaces, not just those on the bottom, thus greatly increasing the chances of germination. By depositing the layered material, the two tasks of applying top dressing and seed are done simultaneously and thereby a total reduction of time and labor is achieved in contrast to doing the two tasks separately.

If desired to use the second embodiment for dispensing only seed, the top dresser hopper 236 can be left empty. Alternately, if it is desired to apply only top dressing while there is seed in the seed hopper, the metering gate 204 is retained in its closed position to prevent seed moving downwardly into the chute 205.

Although the chute has been shown with an end wall longitudinally spaced from and parallel to the discharge end wall 256 and has side walls extending from the chute end wall to wall 256 to provide a guide that is generally rectangular in horizontal cross section, it to be understood the entire chute may be longitudinally spaced from the discharge end wall. In such an event, the chute would be provided with a second end wall (not shown) parallel to the chute end wall to provide a chute that is rectangular in horizontal cross section and longitudinally spaced from the discharge end wall 256.

Even though the second embodiment has been described and shown as having a seed hopper outside of the top dresser hopper, it is to be understood that a seed hopper may be mounted within the top dresser hopper with the seed being discharged from the seed distributor 203 directly onto the top dresser wall 256. In such an event, the seeder attachment would have a chute extending downwardly along end wall 256 to have its lower end closely adjacent to the conveyor upper run longitudinally intermediate the top dresser hopper end walls. Further, a top dresser metering gate would be mounted to the chute to extend transversely across the top dresser hopper to control the amount of top dresser hopper material passing beneath the chute to pass to the nip between the brush and the conveyor. The seeds, if being dispensed, would descend adjacent to the conveyor on the opposite side of the top dresser metering gate from the material in the top dresser interior.

To insure a greater percentage of the seed will be in contact with soil particles and in the most preferred form to allow grass to grow much faster and denser, there is provided a further embodiment of the invention including a terrain preparation attachment, generally designated 300, shown in its preferred form in use with top dresser 200. Generally, attachment 300 includes first and second arms 302 which are pivotally mounted on opposite sides of frame 112 about pivot axis 304. In the preferred form, arms 302 are planar generally perpendicular to axis 304 and generally in the shape of an inverted isosceles trapezoid in the most preferred form, with axis 304 located at the intersection of the minor base and a first side of the trapezoid shape. Arms 302 are pivoted relative to frame 112 by first and second extendable and retractable hydraulic actuators 306 having a first end pivotally mounted to frame 112 about an axis 308 and a second end pivotally mounted to arms 302 about an axis 310 located at the intersection of the major base and the first side of the trapezoid shape as axis 304. Axes 308 and 310 are in a spaced parallel relation to each other and to axis 304.

Attachment 300 further includes a terrain opening element 312 mounted between arms 302 intermediate wheels 116 and the discharge end of conveyor 140 and rotary brush 274. In the preferred form shown, terrain opening element 312 is in the form of a spiking drum rotatably mounted to arms 302 about an axis 314 located at the intersection of the minor base and the second side of the trapezoid shape, with axis 314 being parallel to and spaced from axes 302, 304, 308, and 310. In particular in the preferred form, spiking drum 312 includes a plurality of axially and circumferentially spaced, radially extending spikes 316. Spikes 316 in the most preferred form have circular cross sections. Other shapes may be offered to function in differing soil types. Additionally, it may be advantageous for spikes 316 or similar tines to bring soil from the openings created and deposit the soil on top of the terrain.

Attachment 300 further includes a brushing element 318 mounted between arms 302 and behind rotary brush 274 and the discharge pattern of top dressing and/or seed by top dresser 200. In particular, element 318 extends between the ends of straight extensions to the second sides beyond the major bases of the trapezoid shapes. Brushing element 318 moves top dressing and/or seed off grass blades that are currently growing in the terrain. As shown, brushing element 318 is in the preferred form of a pull bristle brush.

Attachment 300 is movable between raised and lowered positions by actuators 306. Particularly, in the form shown and with actuators 306 in a retracted condition, arms 304 are held relative to frame 112 with elements 312 and 318 in a raised position from the ground. It is desirable to move attachment 300 to its raised position to allow top dresser 200 to make sharp turns easily, if it is not desired to utilize attachment 300 in the operation of top dresser 200, and/or during transport to and from the areas desired to be top dressed. With actuators 306 in an extended condition, arms 304 are held relative to frame 112 with elements 312 and 318 in a lowered position and engaging the terrain. Specifically, element 312 in the preferred form of a spiking drum contacts the terrain with sufficient force so that spikes 316 enter the terrain and puncture the terrain at a depth to reach the soil just below the thatch layer and in all types of soils with various moisture levels. Also, element 318 in the preferred form of a pull brush engages the terrain when attachment 300 is in its lowered position.

In using the third embodiment with top dressing material having been loaded into top dresser hopper 136 and seeds having been loaded into seed hopper 211, top dresser 200 is transported to the terrain desired to be seeded with attachment 300 in its raised position. Then, attachment 300 is moved to its lowered position so that spikes 316 puncture the terrain. It can then be appreciated that as top dresser 200 is moved on the terrain, the terrain is punctured or disturbed to expose more soil and preferably to provide openings in the terrain.

After the terrain is opened by element 312, top dressing and/or seeds are deposited onto the terrain in a manner as previously set forth for the second embodiment. However, the seeds can be propelled into and/or fall into the openings in the terrain. With or without top dressing material, seeds in the openings will be in contact with soil which increases the chances of germination. In the preferred form, spikes 316 are formed on element 312 to form a consistent and continuous pattern of openings of a specific width and depth which best encourage the various types of grass seeds to lie at distances from one another that reflects normal growth spacings and depth into the soil.

After top dressing and/or seeds have been deposited onto the terrain, element 318 will tend to sweep any top dressing and/or seeds off the grass blades currently in the terrain and thus to move seeds that have come to rest on the blades of grass downward to the terrain. When moved downward in the terrain, the seeds will tend to reach the ground and/or fall into the openings formed by element 312 and to be situated to be in contact with soil particles required for germination. Since grass seeds need to be in contact with soil particles in order to germinate, it is necessary to move grass seed supported on grass blades to rest upon the soil and/or be received in the openings formed by element 312. Additionally, element 318 will provide a more homogeneous consistency and an even and level texture to the mixture thus deposited.

It should be appreciated that in the process of growing grass in existing terrain, the grass will grow much faster and denser if several functions are performed. These functions are that the seed is deposited onto the terrain in a consistent and homogeneous manner, that the terrain has been prepared to have exposed soil to encourage contact with the soil particles, that top dressing material is put on top of the grass seed in a controlled quantity or is deposited at the same time as the grass seed in the form of a mixture thereof, and that the seeds and the top dressing are moved off the grass blades that are currently growing in the terrain. Additionally, it is advantageous if the seed can be deposited onto the terrain with some velocity imparted thereto such as by rotating brush 274 or moved in the terrain such as by element 318 to insure a greater percentage of the seed will be in contact with soil particles. Each of the functions thus described when carried out separately is time consuming and expensive both in labor content and in the cost of the several machines required to perform these functions. Top dresser 200 including attachment 300 according to the teachings of the present invention combines these functions into a single, all-inclusive machine that is configured to perform each function in a satisfactory manner without adversely affecting the quality level of the others and specifically to perform each function in a sequence to one another such that the best final result is achieved. Particularly, top dresser 200 including attachment 300 according to the teachings of the present invention provides many of the necessary functions to grow grass seed in a single pass over the terrain and in an effective and economical manner and specifically in a short time span such that the labor content necessary to complete these functions is minimized compared to any current method. In this regard, top dresser 200 in the preferred form must be pulled by a prime mover of sufficient size and power to effectively move top dresser 200 at a speed consistent with the requirements of the operation.

Although in the most preferred form element 312 for preparing the terrain to have exposed soil shown as a spiking drum and element 318 for moving the material downward in the terrain shown as a pull brush are believed to be advantageous for a number of reasons including but not limited to being nonpowered and thereby reducing complexity and increasing the ease of addition to top dresser 200, elements 312 and 318 could be of other forms including powered and nonpowered. In particular, element 312 could be any member which cuts, parts, disturbs, rakes, skarifies, or otherwise punctures the terrain without significantly affecting the health of the grass growing in the terrain. As an example, element 312 could be in the form of a powered slicing drum which provides openings in the terrain in the form of elongated cuts into which seeds have a greater possibility of entry. Similarly, element 318 could be in the form of a slowly rotating brush which gently contacts the grass blades to effectively knock the seeds attached thereto off the blades of grass.

Likewise, although in the preferred form elements 312 and 318 are mounted to the same arms 302 which is believed to be advantageous for a number of reasons including but not limited to reducing the number of actuators 306 required, attachment 300 according to the preferred teachings of the present invention could be formed with elements 312 and 318 being separately movable from each other to allow independent operation thereof. In this regard, the contact force at which elements 312 and 318 engage the terrain can be individually adjusted according to the particular type and condition of the terrain. Similarly, although in the preferred form shown element 312 is located behind wheels 116, element 312 could be positioned at other locations including but not limited to ahead of wheels 116 according to the teachings of the present invention.

Further, although shown and described in connection with the second embodiment of top dresser 200, attachment 300 could be utilized with the first embodiment of top dresser 100 or with top dressers of other types and constructions according to the teachings of the present invention. As an example, the seed hopper and dispenser could be positioned below hopper 136 to dispense seed independent and forward of any top dressing which is dispensed by the top dresser, with the deposit of top dressing with a forceful velocity covering the previously dispensed seeds and providing insurance that the seeds will be in contact with growth enhancing soil particles. In such an arrangement, the seed hopper by necessity is mounted underneath conveyor 140 which provides a cover and protects the seed hopper from the elements. A sliding mechanism could be provided to allow the seed hopper to be pulled from beneath conveyor 140 to allow ease of filling the seed hopper with seed. Additionally, in this particular arrangement, the seeds could be deposited very close to the terrain in a manner to be unaffected by outside forces (such as wind) that would disturb the controlled flow patterns of the deposit of seed in the desired manner.

Further, it is to be understood that even though the invention has been described with reference to the conveyor being an endless belt type conveyor, the conveyor may be a cylindrical drum and a pusher such as described in U.S. Pat. No. 5,307,952, provided the hopper of the respective embodiment is appropriately modified.

With reference to the three embodiments, the discharge end wall may be either the front wall or rear wall of the respective hopper, with the end walls extending transverse to the direction of longitudinal movement of the frame when being used to apply seed and/or top dressing to the terrain.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Apparatus adapted to move across terrain in a longitudinal direction for dispensing seeds, top dressing and similar type materials comprising, in combination: a frame having a discharge end portion; means for movably supporting the frame upon the terrain; a material hopper mounted to the frame for containing material to be dispensed; conveyor means mounted to the frame for moving material from the hopper and discharging the moved material to the terrain at the discharge end portion, with the material hopper having a hopper interior and a discharge end wall having a lower edge vertically above the conveyor means to provide a discharge opening and metering means movable between a closed position for closing the discharge opening and an open position for controlling the amount of material moving from the material hopper interior beneath the discharge end wall lower edge and to the discharge end portion to be dispensed to the terrain; and means mounted to the frame for preparing the terrain to have exposed soil before the material is discharged to the terrain at the discharge end portion.

2. The apparatus of claim 1 further comprising, in combination: means mounted to the frame for moving the material downward in the terrain after the material is discharged to the terrain at the discharge end portion.

3. The apparatus of claim 2 further comprising, in combination: a transverse rotary brush mounted to the frame to coact with the conveyor means for downwardly propelling the material on the conveyor means to the terrain, with the brush being rotatable about a transverse axis.

4. The apparatus of claim 3 further comprising, in combination: first and second arms pivotally mounted on opposite sides of the frame, with the preparing means being mounted between the first and second arms, with the moving means being mounted between the first and second arms; and means for moving the first and second arms between a raised position and a lower position, with the preparing means and the moving means being spaced from the terrain in the raised position, with the preparing means and the moving means contacting the terrain in the lower position.

5. The apparatus of claim 4 wherein the preparing means comprises means for providing openings in the terrain.

6. The apparatus of claim 5 wherein the preparing means comprises a spiking roller rotatably mounted between the first and second arms, with the spiking roller including a plurality of axially and circumferentially spaced, radially extending spikes.

7. The apparatus of claim 6 wherein the spiking roller is not powered.

8. The apparatus of claim 6 wherein the moving means comprises a brush.

9. The apparatus of claim 8 wherein the moving means comprises a pull bristle brush.

10. The apparatus of claim 3 further comprising, in combination: a seeder attachment mounted to the frame for selectively dispensing seed, with the seeder attachment including a seed hopper for containing seed and distributor means for controlling the amount of seed being dispensed, with the seed being dispensed after the soil has been exposed by the preparing means and before the moving means.

11. The apparatus of claim 10 wherein the seeder attachment is mounted to the frame for selectively dispensing seed for conveyance by the conveyor means to the discharge end portion.

12. The apparatus of claim 11 wherein the seeder attachment is mounted to the frame for selectively dispensing seed on the material moving from the hopper by the conveyor means and before being discharged at the discharge end portion.

13. The apparatus of claim 12 wherein the conveyor means includes a sheeting movable around an axis, with the transverse rotary brush mounted to the frame adjacent to the discharge end portion to extend above the conveyor means and parallel to the axis for rotatably coacting with the conveyor means to contact the material and seeds on the sheeting after the material and seeds have started to move downwardly along with the sheeting and have passed through a vertical plane of the axis of the conveyor means to propel the material and seeds on the conveyor means downwardly to the terrain.

14. The apparatus of claim 1 wherein the metering means includes a first gate member movable between the metering means positions and, in the metering means closed position, abutting against the conveyor means and extending vertically perpendicular to the conveyor means, wherein the discharge end wall extends relative to the horizontal at an angle substantially less than 90 degrees and the metering means includes a second metering gate member mounting the first gate member and extending thereabove at substantially the same angle as the discharge end wall in abutting relationship to the discharge end wall when the metering means is in its closed position.

15. The apparatus of claim 1 wherein the metering means includes a transverse metering gate adjacent to the end wall that is movable between a closed position extending perpendicular to the conveyor means to block the movement of material by the conveyor means from the material hopper and a metered opened position to selectively limit the rate of discharge of the material from the material hopper.

16. Method of seeding an area of terrain, comprising the steps of: loading seed into a seed hopper; moving the seed hopper along the terrain; selectively mechanically conveying seed from within the hopper to a discharge end portion; downwardly propelling seed at the discharge end portion to the terrain along a trajectory that is both vertical and horizontal; dispensing the seed on a layer of top dressing material for being commingled therewith as the seed is being downwardly propelled, wherein the step of dispensing the seed on the layer of top dressing material comprises the steps of providing a top dresser including a frame having the discharge end portion, a material hopper mounted to the frame for containing top dressing material to be dispensed, and a conveyor mounted to the frame for moving top dressing material from the hopper and discharging the moved top dressing material to the terrain at the discharge end portion, with the material hopper having a hopper interior and a discharge end wall having a lower edge vertically above the conveyor to provide a discharge opening and a metering gate movable between a closed position for closing the discharge opening and an open position for controlling the amount of top dressing material moving from the material hopper interior beneath the discharge end wall lower edge and to the discharge end portion to be dispensed to the terrain, and movably supporting the frame upon the terrain, with the step of moving the seed hopper comprising the step of mounting the seed hopper to the frame, with the step of selectively mechanically conveying seed comprising the step of selectively dispensing seed on the top dressing material moving from the material hopper on the conveyor and before being discharged at the discharge end portion; and preparing the terrain to have exposed soil before the top dressing material is discharged to the terrain at the discharge end portion by a terrain preparation member mounted to the frame.

17. The method of claim 16 further comprising the step of moving the seed and top dressing material downward to and into the terrain after the seed and top dressing material are discharged to the terrain at the discharge end portion by a moving member mounted to the frame.

18. Method for dispensing seeds, top dressing and similar type materials comprising the steps of: providing a frame having a discharge end portion and a material hopper mounted to the frame for containing material to be dispensed; movably supporting the frame upon the terrain; moving material from the hopper by a conveyor mounted to the frame and discharging the moved material from the conveyor to the terrain at the discharge end portion, with the material hopper having a hopper interior and a discharge end wall having a lower edge vertically above the conveyor to provide a discharge opening and having a metering gate movable between a closed position for closing the discharge opening and an open position for controlling the amount of material moving from the material hopper interior beneath the discharge end wall lower edge and to the discharge end portion to be dispensed to the terrain by the conveyor; and preparing the terrain to have exposed soil before the material is discharged to the terrain at the discharge end portion by a terrain preparation member mounted to the frame.

19. The method of claim 18 further comprising the step of moving the material downward to and into the terrain after the material is discharged to the terrain at the discharge end portion by a moving member mounted to the frame.

* * * * *